United States Patent
Brown

(10) Patent No.: US 7,421,848 B2
(45) Date of Patent: Sep. 9, 2008

(54) AUTOMATED HOSE CLEARING AFTER REFRIGERANT CHARGING METHOD

(75) Inventor: William Brown, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 228 days.

(21) Appl. No.: 11/270,838

(22) Filed: Nov. 10, 2005

(65) Prior Publication Data
US 2006/0277935 A1    Dec. 14, 2006

Related U.S. Application Data

(60) Provisional application No. 60/626,942, filed on Nov. 12, 2004.

(51) Int. Cl.
F25B 45/00    (2006.01)

(52) U.S. Cl. ............................................. 62/149

(58) Field of Classification Search ............... 62/127, 62/129, 126, 292, 149; 251/149.6; 137/315.16
See application file for complete search history.

(56) References Cited

U.S. PATENT DOCUMENTS

| | | | | |
|---|---|---|---|---|
| 2,907,460 | A * | 10/1959 | Welch | 210/110 |
| 4,261,178 | A | 4/1981 | Cain | 62/149 |
| 4,768,347 | A | 9/1988 | Manz et al. | 62/149 |
| 4,809,520 | A | 3/1989 | Manz et al. | 62/292 |
| 4,938,031 | A | 7/1990 | Manz et al. | 62/145 |
| 5,005,369 | A | 4/1991 | Manz | 62/195 |
| 5,214,931 | A * | 6/1993 | Paige | 62/125 |
| 5,248,125 | A | 9/1993 | Fritch et al. | 251/149.6 |
| 5,249,434 | A * | 10/1993 | Abraham | 62/292 |
| 5,540,254 | A * | 7/1996 | McGowan et al. | 137/315.01 |
| 5,560,215 | A * | 10/1996 | Talarico | 62/149 |
| 5,603,223 | A | 2/1997 | Murray et al. | 62/84 |
| 5,626,170 | A | 5/1997 | Parker | 141/98 |
| 5,802,859 | A * | 9/1998 | Zugibe | 62/125 |
| 5,906,106 | A | 5/1999 | Brown et al. | 62/195 |
| 6,016,661 | A * | 1/2000 | Sagar | 62/149 |
| 6,119,475 | A | 9/2000 | Murray et al. | 62/292 |
| 6,134,462 | A | 10/2000 | Rantala | 600/353 |
| 6,134,896 | A | 10/2000 | Brown et al. | 62/149 |
| 6,134,899 | A | 10/2000 | Brown et al. | 62/195 |
| D433,346 | S | 11/2000 | Evans et al. | D10/75 |
| 6,185,944 | B1 * | 2/2001 | Gaul | 62/115 |
| 6,202,433 | B1 | 3/2001 | Murray et al. | 62/292 |
| 6,272,871 | B1 * | 8/2001 | Eisenhour | 62/225 |
| 6,334,320 | B1 | 1/2002 | Brown et al. | 62/149 |
| 6,360,551 | B1 * | 3/2002 | Renders | 62/127 |
| 6,374,872 | B1 | 4/2002 | Tarabocchia | 141/98 |
| 6,378,657 | B2 | 4/2002 | Viken | 184/1.5 |
| 6,553,827 | B2 | 4/2003 | McCormick | 73/196 |
| 7,086,237 | B2 * | 8/2006 | Arshansky et al. | 62/77 |
| 7,260,943 | B2 * | 8/2007 | Carrubba et al. | 62/77 |
| 2004/0061089 | A1* | 4/2004 | Payne | 251/149.9 |

FOREIGN PATENT DOCUMENTS

JP    9-303885 A  *  11/1997

* cited by examiner

*Primary Examiner*—Mohammad M Ali
(74) *Attorney, Agent, or Firm*—Baker & Hostetler LLP

(57) ABSTRACT

An automated hose clearing after refrigerant charge method and appropriate apparatus is provided. The method includes detecting a pressure differential between the interiors of a high and low pressure hose on an air conditioning charging unit, determining if a pressure differential exceeds a predetermined threshold and temporarily providing fluid communication between the interiors of the high and low pressure hoses.

10 Claims, 3 Drawing Sheets

AUTOMATED HOSE CLEARING AFTER REFRIGERANT CHARGING METHOD

CROSS-REFERENCE TO RELATED APPLICATIONS

This application claims priority to U.S. Provisional Patent Application entitled, AUTOMATED HOSE CLEARING AFTER REFRIGERANT CHARGING METHOD, filed Nov. 12, 2004, having a Ser. No. 60/626,942, the disclosure of which is hereby incorporated by reference in its entirety.

FIELD OF THE INVENTION

The present invention relates generally to machines for charging air conditioning systems in vehicles. More particularly, the present invention relates to clearing the high pressure hose of refrigerant after charging a vehicle's air conditioning system.

BACKGROUND OF THE INVENTION

When charging refrigerant in air conditioning systems, inaccurate measuring how much refrigerant enters an air conditioning system during a charge can effect the air conditioning system performance. Charging machines (sometimes called recovery units) are often used to charge air conditioning systems.

After charging some air conditioning systems, the high side service hose of a charging unit may be filled with high-pressure liquid refrigerant. Disconnecting the hose while it is full of refrigerant may cause the system being serviced to be undercharged which can result in poor air conditioning system performance.

Accordingly, it is desirable to provide a method and apparatus that allows refrigerant from the high side hose of the charging unit to equalize (thus causing refrigerant from the high side of the system to enter the air conditioning system) with the low side of the air conditioning system before the low side hose is removed from the air conditioning system.

SUMMARY OF THE INVENTION

The foregoing needs are met, to a great extent, by the present invention, wherein in one aspect an apparatus and method are provided that in some embodiments allows refrigerant from the high side hose of the charging unit to equalize (thus causing refrigerant from the high side of the system to enter the air conditioning system) with the low side of the air conditioning system before the low side hose is removed from the air conditioning system.

In accordance with one embodiment of the present invention, a method of clearing the interior of a high pressure hose connected to an air conditioning system is provided. The method includes detecting a pressure differential between the interiors of a high and low pressure hose, determining if the pressure differential exceeds a predetermined threshold, and temporally providing fluid communication between the interiors of the high and low pressure hoses.

In accordance with another embodiment of the present invention, a storage media containing code for detecting a pressure differential between the interiors of a high and low pressure hose, determining if the pressure differential exceeds a predetermined threshold, and temporally providing fluid communication between the interiors of the high and low pressure hoses is provided.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
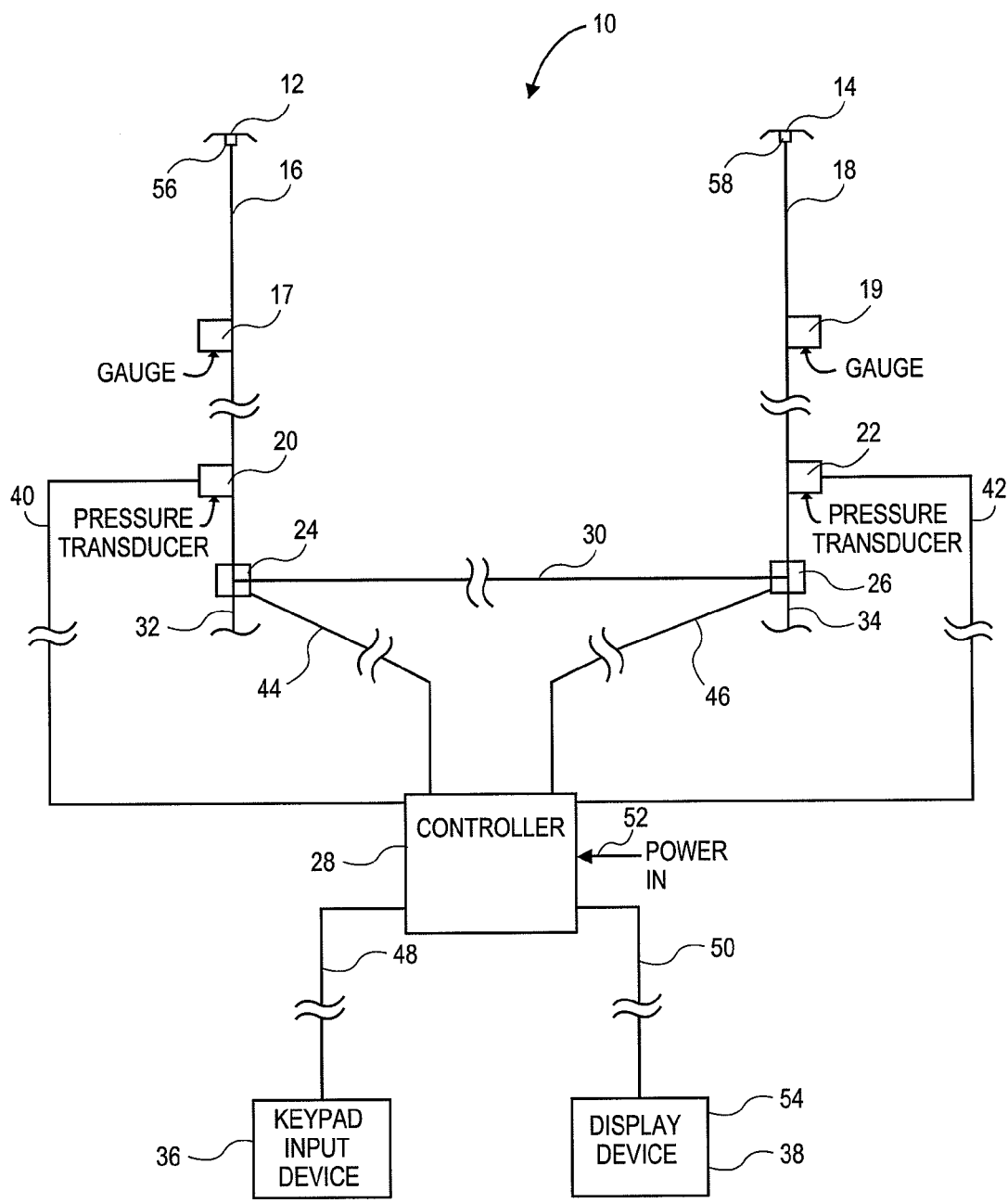
FIG. 1 is a schematic diagram illustrating components of a charging unit used to accomplish clearing of the high side hose according to an embodiment of the invention.

The invention will now be described with reference to the drawing figures, in which like reference numerals refer to like parts throughout. An embodiment in accordance with the present invention provides a charging unit that allows refrigerant from the high side hose of the charging unit to equalize (thus causing refrigerant from the high side of the system to enter the air conditioning system) with the low side of the air conditioning system before the low side hose is removed from the air conditioning system.

Examples or aspects of charging units are described in at least some of U.S. Pat. Nos. D433,346; 4,938,031; 5,005,369; 5,248,125; 4,261,178; 4,768,347; 4,809,520; 5,603,223; 6,202,433; 6,334,320; 6,119,475; 6,134,899; 6,134,896; 6,138,462; 5,906,106 and U.S. patent application Ser. No. 10/178,526, all of which are incorporated herein in their entirety.

FIG. 1 is a schematic diagram illustrating components of a charging unit 10 used to accomplish clearing of the high side hose according to an embodiment of the invention. While this discussion is primarily focused on charging units, some embodiments of the invention may also be practiced on air conditioning system tester units.

The charging unit 10 includes a high side refrigerant hose 16 coupled to a high pressure side 12 of a vehicle's air conditioning system. Generally, when connected, the high pressure hose 16 is in fluid communication with the high pressure side 12 of the vehicle's air conditioning system. The hose 16 is attached to the high pressure side 12 of the vehicle's air conditioning system near the refrigerant exiting the compressor (not shown) of the vehicle's air conditioning system. A low pressure hose 18 is connected to the low pressure side 14 of the vehicle's air conditioning system near the refrigerant entering the compressor in the vehicle's air conditioning system.

Fitting 56 on the high pressure hose 16 prevents refrigerant within the hose 16 from exiting the hose 16 when the hose 16 is disconnected from the high pressure side 12 of the vehicle's air conditioning system. Similarly, fitting 58 is located at the end of the low pressure hose 18 to avoid the refrigerant within the low pressure hose 18 from exiting the low pressure hose 18 when the low pressure hose 18 is disconnected from the low pressure side 14 of the vehicle's air conditioning system 14.

Located on the high pressure hose 16 is a gauge 17. The gauge 17 may be a manual gauge 17 as configured to indicate the pressure (gauge pressure, with respect to the ambient pressure) of the refrigerant within the high pressure hose 16. A similar gauge 19 is located on the low pressure hose 18 and is configured to indicate the pressure of the refrigerant located within the low pressure hose 18.

A pressure transducer 20 is located on the high pressure hose 16 and is connected by connector 40 to a controller 28. The pressure transducer 20 is configured to indicate the pressure of the refrigerant within the high pressure hose 16 and indicate that pressure by a signal to the controller 28. The low pressure hose 18 also has a pressure transducer 22 that is configured to indicate the pressure of the refrigerant located within the low pressure hose 18. The pressure transducer 22 is connected to the controller 28 via a connector 42 that is configured to indicate to the controller 28 the pressure of the refrigerant within the low pressure hose 18 via a signal.

A shunt or a connector hose 30 connects the high pressure hose 16 with the low pressure hose 18 via valves 24 and 26. In some embodiments of the invention, valves 24 and 26 are one-way solenoid valves and are connected to the controller 28 via connectors 44 and 46. Further, valves 24 and 26 are configured to open or close, to allow fluid communication of the refrigerant between hose 16 and hose 18 via hose 30, depending on signals transmitted by the controller 28.

An end 32 of the high pressure hose 16 is shown truncated and is connected to other parts of the charging unit 10 for other purposes such as, for example, charging the air conditioning system. Likewise, an end 34 of the hose 18 is also shown truncated and connects to other parts of the charging unit 10 not associated with the invention. The controller 28, in some embodiments of the invention, is a programmable microcontroller or a Field Programmable Gate Array (FPGA) and has a power input 52 in order to provide power to the controller and, in some embodiments of the invention, also the valves 24 and 26.

An input device 36, which in some embodiments of the invention, includes a keypad, is connected to the controller 28 by a connector 48. A display device 38 is also connected to the controller 28 by a connector 50. In some embodiments of the invention, the display device may be a LED screen or any other suitable display means. In some embodiments of the invention, the display device 38 may include an audio output device 54. Further, in other embodiments of the invention, the audio output device 54 may be located separately from the display device 38.

Figure 2:
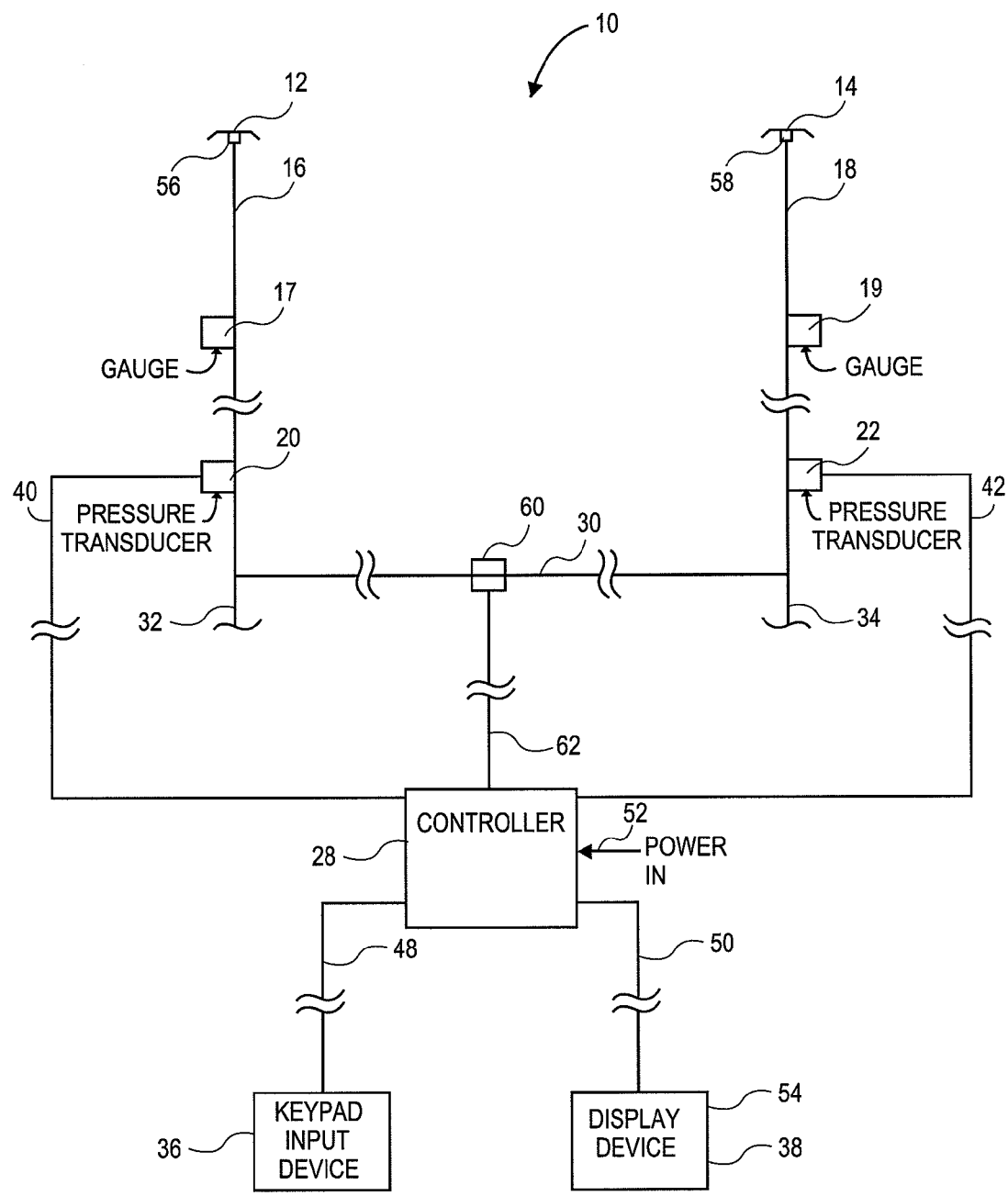
FIG. 2 is a schematic diagram illustrating components of the charging unit used to accomplish clearing of the high side hose according to another embodiment of the invention.

FIG. 2 is a schematic diagram illustrating components of the charging unit 10 used to accomplish clearing of the high side hose according to another embodiment of the invention.

FIG. 2 is similar to FIG. 1 except that as shown in FIG. 1, two valves 24 and 26 connecting the connector hose 30 to the high pressure hose 16 and low pressure hose 18 are replaced in FIG. 2 by a single valve 60 located on the connector hose 30.

The single valve 60 connects the high pressure hose 16 to the low pressure hose 18. The single valve 60 is then connected to the controller 28 by connection 62. As shown in FIG. 2, communication between the high pressure hose 16 and the low pressure hose 18 is controlled by the single valve 60. The single valve 60 selectively provides two-way communication of refrigerant through connector hose 30 to one or the other of the high and low pressure hoses 16 and 18, respectively, according to signals received from the controller 28.

Two one-way valves 24 and 26 may be used to provide two-way communication between hoses 16 and 18, or a single two-way valve 60, as shown in FIG. 2 may be used, as either design, or other suitable designs are in accordance with the spirit of invention. Thus, any suitable arrangement providing for fluid communication between the hoses 16 and 18 may be appropriate.

Now that two examples of the suitable charging unit 10, as shown in FIG. 1 and FIG. 2, have been described for performing some embodiments of the invention, a method, in accordance with the invention, suitable for use on the charging unit 10 shown in both FIG. 1 and FIG. 2, will now be described.

Figure 3:
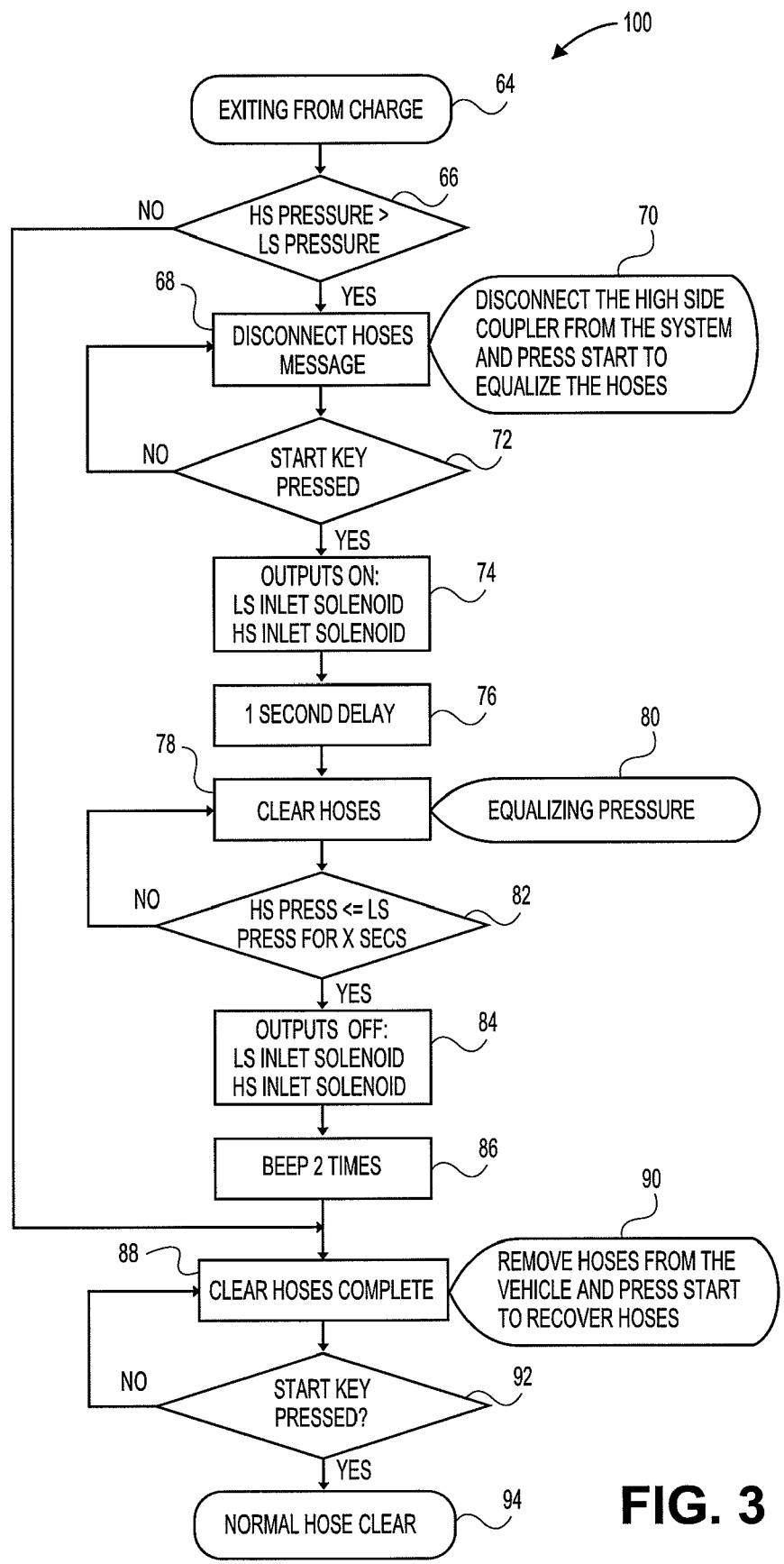
FIG. 3 is a flowchart illustrating steps that may be followed in accordance with one embodiment of the method or process of clearing the high side hose of a charging unit.

FIG. 3 is a flowchart illustrating steps that may be followed in accordance with one embodiment of the method or process of clearing the high side hose of a charging unit. In some embodiments of the invention, the method 100 is performed by the charging unit 10 which is controlled by the controller 28. The commands to perform the method 100 are embedded in a software program running on the controller 28. Once the charging unit 10 or testing unit has completed its charging of the vehicle's air conditioning system, it is possible that a significant amount of air conditioning fluid (refrigerant) is retained within the high pressure hose 16. In order to remove a large portion of the refrigerant left within the high pressure hose 16 and place it into the vehicle's air conditioning system, a method 100, in accordance with the invention, is employed.

The air conditioning fluid within the high pressure hose 16 is placed in fluid communication to the low pressure hose 18, which allows the fluid to flow from the high pressure hose 16 into the low pressure hose 18 and into the vehicle's air conditioning system. A detailed description of the method 100, as shown in FIG. 3, will now follow.

Once charge routine 64 or test routine is completed, the method 100 operates. At the first step 66, the controller 28 compares the pressure within the high pressure hose 16 to the pressure within the low pressure hose 18, as reported by the pressure transducers 20 and 22. If the pressure within the high pressure hose 16 exceeds a certain first threshold, which in some embodiments, is about 10 psi, then the controller 28 will initiate a hose clearing routine comprising, in some embodiments, steps 68 through 86, as shown in FIG. 3.

If the controller 28 determines that the difference in pressure between the high pressure hose 16 and low pressure hose 18 exceeds the first threshold, then in the next step 68, a message is shown on the display device 38. The message can be, for example, indicated in bubble 70, which instructs the user to disconnect the high side coupler 56 from the air conditioning system 12 and press a start key at step 72 on the keypad input device 36 to equalize the hoses 16 and 18. The high side hose 16 is then disconnected from the high side of the air conditioning system 12 by the operator. The fitting 56 will prevent refrigerant from leaking out of the hose 16.

Once the start key is pressed, as indicated in step 72, the controller 28 will generate outputs in step 74 to the high side solenoid valve 24 and the low side solenoid valve 26 to allow fluid communication between the high pressure hose 16 and the low pressure hose 18 via the valves 24 and 26, or alternately, the single valve 60, and the connecting hose 30.

In some embodiments of the invention, a one second delay, as indicated in step 76, will occur and the next step 78 will be used to cause the controller 28 to send a signal to the display device 38 to indicate a message to a user as shown in bubble 80 that the machine is equalizing pressure. Then at step 82, the controller 28 will compare the pressure within the high pressure hose 16 and the low pressure hose 18 of the refrigerant within the respective hoses as reported by the pressure transducers 20 and 22. The controller compares those pressures to see if it is less than or equal to a certain second threshold, which in some embodiments of the invention, is about 5 psi.

If the controller 28 determines that the pressure differential within the hoses 16 and 18 is equal to or below the second threshold, then the outputs to solenoid valves 24 and 26 or 60 will end, causing the solenoid valves 24 and 26 or 60 to go to a position wherein fluid communication is no longer available between the interiors of hoses 16 and 18 via the valves 24 and 26 or 60 and the connecting hose 30.

In an embodiment of the invention, the output 74 from the controller 28 goes to the dual direction single valve 60. In the alternative, the output 74 may also go to the single directional solenoid valves 24 and 26. Correspondingly, in one embodiment, the output 74, when shut off, is shut off to the dual directional single valve 60. In the alternative, the output 74, when shut off, is shut off to the valves 24 and 26. The result of permitting communication between the high and low pressure hoses 16 and 18 via the valves, whether 60 or 24 and 26, and the connecting hose 30 is the same.

In some embodiments of the invention, the controller 28 may move to step 84 from step 82 even if the pressure differential between the interior hoses 16 and 18 is greater than the second threshold if the fluid communication via connector hose 30 and valves 24 and 26 or valve 60 is open for longer than a certain amount of time, which, in some embodiments of the invention, is about 30 seconds. Thus, in some embodiments of the invention, the interiors of high pressure hose 16 and low pressure hose 18 are in fluid communication via the connector hose 30 and valves 24 and 26 or valve 60 for a predetermined period of time or until the pressure within high pressure hose 16 and low pressure hose 18 is equal to or less than the second threshold or for a certain length of time, whichever event occurs first.

Thus, the fluid communication depends on time and pressure. Then, as shown in step 84, the valves 24 and 26 or 60 close, thus ending fluid communication between the interior high pressure hose 16 and low pressure hose 18.

Returning to step 66, if the controller 28 determines that the pressure differential between the refrigerant in hose 16 and hose 18 does not exceed the first threshold, then the method jumps to step 88 where a signal will be sent to the display device 38 to indicate to a user to remove both hoses 16, 18 from the vehicle and press start to recover hoses, as indicated in bubble 90. Once the start key, located on the keypad of the input device 36, is pressed at step 92 a normal hose clear operation 94 will be undertaken, ending the method according to an embodiment of the present invention.

In some embodiments of the invention, once the fluid communication between the high pressure hose 16 and low pressure hose 18 has ended, then, as indicated in step 86, an audio output 54 will make a noise to alert the operator, which, in some embodiments of the invention, is to beep twice. Then the next step 88 is to indicate on the display device 38, to remove the hose 18 from the vehicle and press start to initiate the hose recover clearing routine.

Embodiments of the invention include storage media containing executable code for performing methods in accordance with the invention. The storage media may be any type of computer readable storage media such as floppy discs, CD, DVD, flash memory, and the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hose clearing apparatus, comprising:
   a valve connected to provide fluid communication between a first hose and a second hose;
   a controller connected to detect if the first hose is disconnected from a vehicle, wherein the controller is operably connected to the valve, and wherein the controller is connected to control a flow of a refrigerant from the first hose through the valve to the second hose if the controller detects the first hose is disconnected from the vehicle;
   a pressure transducer operably connected to the controller to monitor the pressure in the first and second hoses, wherein the controller is connected to determine a pressure difference between the first and second hoses; and
   a fitting in fluid communication with the first and second hoses, wherein the fitting prevents fluid from exiting the first and second hoses when the hoses are not connected to the vehicle.

2. The hose clearing apparatus of claim 1, wherein the first and second hoses are configured to couple to a vehicle's air conditioning system.

3. The hose clearing apparatus of claim 1, wherein the first and second hoses are configured with a pressure gauge.

4. The hose clearing apparatus of claim 1, wherein the controller is configured to open the valve when the difference in the pressures between the first and second hoses is at a predetermined level.

5. The hose clearing apparatus of claim 1, wherein the valve comprises a first valve coupled to the first hose and a second valve coupled to the second hose.

6. The hose clearing apparatus of claim 1, wherein the controller is coupled to an input device.

7. The hose clearing apparatus of claim 1, wherein the controller is coupled to an indicator.

8. The hose clearing apparatus of claim 1, wherein the valve is a two-way valve.

9. The hose clearing apparatus of claim 4, wherein if the controller determines that the pressure differential between the hoses is greater than the predetermined level, the controller is configured to transfer refrigerant from one hose to the other hose to approximately equalize the pressure in the hoses.

10. The hose clearing apparatus of claim 4, wherein if the controller determines that the pressure differential is less than or equal to the predetermined level, the controller is configured to close the valve ending fluid communication between the hoses.

* * * * *